United States Patent
Evans

(10) Patent No.: US 11,971,371 B2
(45) Date of Patent: Apr. 30, 2024

(54) SAMPLE INSPECTION SYSTEM COMPRISING A BEAM FORMER TO PROJECT A POLYGONAL SHELL BEAM

(71) Applicant: THE NOTTINGHAM TRENT UNIVERSITY, Nottingham (GB)

(72) Inventor: Paul Evans, Nottingham (GB)

(73) Assignee: THE NOTTINGHAM TRENT UNIVERSITY, Nottingham (GB)

(*) Notice: Subject to any disclaimer, the term of this patent is extended or adjusted under 35 U.S.C. 154(b) by 48 days.

(21) Appl. No.: 17/623,462

(22) PCT Filed: Jun. 16, 2020

(86) PCT No.: PCT/GB2020/000060
§ 371 (c)(1),
(2) Date: Dec. 28, 2021

(87) PCT Pub. No.: WO2021/005320
PCT Pub. Date: Jan. 14, 2021

(65) Prior Publication Data
US 2022/0381710 A1 Dec. 1, 2022

(30) Foreign Application Priority Data
Jul. 10, 2019 (GB) .................................. 1909917

(51) Int. Cl.
*G01N 23/087* (2018.01)
*G01N 23/083* (2018.01)
(Continued)

(52) U.S. Cl.
CPC ..... *G01N 23/20083* (2013.01); *G01N 23/083* (2013.01); *G01N 23/087* (2013.01);
(Continued)

(58) Field of Classification Search
CPC .... G01N 23/04; G01N 23/046; G01N 23/083; G01N 23/087; G01N 23/20;
(Continued)

(56) References Cited

U.S. PATENT DOCUMENTS

| 4,480,332 A | 10/1984 | Strecker |
| 4,821,304 A * | 4/1989 | Danos .................. G21K 1/025 |
| | | 976/DIG. 429 |

(Continued)

FOREIGN PATENT DOCUMENTS

| GB | 2 560 164 A | 9/2018 |
| WO | 2008/149078 A1 | 12/2008 |

(Continued)

OTHER PUBLICATIONS

International Preliminary Report on Patentability dated Jan. 20, 2022 from corresponding International Patent Application PCT/GB2020/000060, 8 pages.
(Continued)

Primary Examiner — Allen C. Ho
(74) Attorney, Agent, or Firm — Ruggiero McAllister & McMahon LLC

(57) ABSTRACT

A sample inspection system contains a source of electromagnetic radiation and an apparatus that includes a beam former, a collimator and an energy resolving detector. The beam former is adapted to receive electromagnetic radiation from the source to provide a polygonal shell beam formed of at least three walls of electromagnetic radiation. The collimator has a plurality of channels adapted to receive diffracted or scattered radiation at an angle. The energy resolving detector is arranged to detect radiation diffracted or scattered by a sample upon incidence of the polygonal shell beam onto the sample and transmitted by the collimator.

24 Claims, 11 Drawing Sheets

(51) Int. Cl.
*G01N 23/20* (2018.01)
*G01N 23/20008* (2018.01)
*G01N 23/205* (2018.01)
*G01N 23/2055* (2018.01)
*G01V 5/22* (2024.01)
*G01V 5/222* (2024.01)
*G01V 5/226* (2024.01)
*G21K 1/02* (2006.01)

(52) U.S. Cl.
CPC ....... *G01N 23/20* (2013.01); *G01N 23/20008* (2013.01); *G01N 23/205* (2013.01); *G01N 23/2055* (2013.01); *G01V 5/22* (2024.01); *G01V 5/222* (2024.01); *G01V 5/224* (2024.01); *G01V 5/226* (2024.01); *G01V 5/232* (2024.01); *G21K 1/02* (2013.01); *G21K 1/025* (2013.01); *G01N 2223/04* (2013.01); *G01N 2223/045* (2013.01); *G01N 2223/056* (2013.01); *G01N 2223/316* (2013.01); *G01N 2223/401* (2013.01)

(58) Field of Classification Search
CPC ....... G01N 23/20008; G01N 23/20025; G01N 23/20066; G01N 23/20083; G01N 23/20091; G01N 23/201; G01N 23/205; G01N 23/2055; G01N 23/207; G01N 2223/045; G01N 2223/051; G01N 2223/054; G01N 2223/055; G01N 2223/056; G01N 2223/0561; G01N 2223/0563; G01N 2223/063; G01N 2223/1016; G01N 2223/316; G01N 2223/3308; G01N 2223/401; G01N 2223/50; G01N 2223/501; G01N 2223/5015; G01V 5/0016; G01V 5/0025; G01V 5/0041; G01V 5/005; G01V 5/0066; G21K 1/02; G21K 1/025
USPC ....... 378/5–7, 19, 51, 57, 58, 71–74, 82–90, 378/147, 149, 154
See application file for complete search history.

(56) References Cited

U.S. PATENT DOCUMENTS

| | | | | |
|---|---|---|---|---|
| 4,845,769 A | | 7/1989 | Burstein et al. | |
| 4,956,856 A | * | 9/1990 | Harding | G01N 23/201 378/89 |
| 5,007,072 A | * | 4/1991 | Jenkins | G01N 23/207 378/57 |
| 5,247,561 A | * | 9/1993 | Kotowski | G01V 5/005 378/89 |
| 5,265,144 A | * | 11/1993 | Harding | G21K 1/025 378/86 |
| 5,491,738 A | * | 2/1996 | Blake | G01N 23/207 378/90 |
| 5,651,047 A | * | 7/1997 | Moorman | G01T 1/20182 378/19 |
| 5,684,851 A | * | 11/1997 | Kurbatov | G01N 23/046 378/154 |
| 5,696,806 A | * | 12/1997 | Grodzins | G01N 23/20083 378/86 |
| 5,717,733 A | * | 2/1998 | Kurbatov | G01N 23/207 378/71 |
| 5,787,145 A | * | 7/1998 | Geus | G01N 23/207 378/57 |
| 5,933,473 A | * | 8/1999 | Kitaguchi | G01N 23/046 378/57 |
| 6,122,344 A | * | 9/2000 | Beevor | G01V 5/0025 378/57 |
| 6,163,592 A | * | 12/2000 | He | G01N 23/20 378/70 |
| 6,744,845 B2 | * | 6/2004 | Harding | A61B 6/032 378/86 |
| 7,092,485 B2 | * | 8/2006 | Kravis | G01N 23/20 378/57 |
| 7,283,613 B2 | * | 10/2007 | Harding | G01V 5/0025 378/57 |
| 7,324,627 B2 | * | 1/2008 | Harding | G01V 5/0025 378/62 |
| 7,474,728 B2 | * | 1/2009 | Schlomka | A61B 6/483 378/7 |
| 7,499,523 B2 | * | 3/2009 | Harding | G01N 23/20083 378/90 |
| 7,519,154 B2 | * | 4/2009 | Harding | G01N 23/207 378/83 |
| 7,529,340 B2 | * | 5/2009 | Harding | G01N 23/207 378/70 |
| 7,587,026 B2 | * | 9/2009 | Harding | G01N 23/201 378/70 |
| 7,623,616 B2 | * | 11/2009 | Ziegler | A61B 6/4241 378/86 |
| 7,697,664 B2 | * | 4/2010 | Harding | G01N 23/207 378/71 |
| 7,702,073 B2 | * | 4/2010 | Harding | G21K 1/025 378/150 |
| 7,738,729 B2 | * | 6/2010 | Harding | G06T 11/008 378/57 |
| 7,756,249 B1 | * | 7/2010 | Harding | H01J 35/02 378/87 |
| 7,764,764 B2 | * | 7/2010 | Harding | G01N 23/20083 378/70 |
| 7,773,724 B2 | * | 8/2010 | Harding | G01N 23/207 378/71 |
| 7,787,591 B2 | * | 8/2010 | Harding | G01V 5/00 378/87 |
| 7,831,019 B2 | * | 11/2010 | Harding | G01N 23/20083 378/70 |
| 7,835,495 B2 | * | 11/2010 | Harding | G01V 5/0025 378/57 |
| 7,856,083 B2 | * | 12/2010 | Harding | G01N 23/20 378/86 |
| 8,094,785 B2 | * | 1/2012 | Heid | G21K 1/04 378/150 |
| 8,139,717 B2 | * | 3/2012 | Harding | G21K 1/025 378/147 |
| 8,290,120 B2 | * | 10/2012 | Bjorkholm | G01N 23/087 378/53 |
| 8,625,740 B2 | * | 1/2014 | Harding | G01N 23/20 378/207 |
| 8,971,488 B2 | * | 3/2015 | Parham | A61B 6/542 378/85 |
| 9,341,583 B2 | * | 5/2016 | Sakumura | G01N 23/207 |
| 10,948,432 B2 | * | 3/2021 | Evans | G01N 23/20008 |
| 11,624,717 B2 | * | 4/2023 | Evans | G01N 23/20008 378/79 |
| 11,788,975 B2 | * | 10/2023 | Fink | G01N 23/207 378/71 |
| 2010/0061511 A1 | | 3/2010 | Heid | |
| 2015/0146960 A1 | | 5/2015 | Sakumura et al. | |

FOREIGN PATENT DOCUMENTS

WO 2014/209158 A1 12/2014
WO 2018/154308 A1 8/2018

OTHER PUBLICATIONS

Spencer et al.; "Direct Visualization of Bragg Diffraction with a He—Ne Laser and an Ordered Suspension of Charged Microspheres"; Journal of Chemical Education, vol. 68, No. 2, Feb. 1991, pp. 97-100.

Instruction Manual and Experiment Guide for the PASCO Scientific Model WA-9314B, Microwave Optics, 012-04630F, Apr. 1999, 54 pages.

(56) References Cited

OTHER PUBLICATIONS

UK Examination Report dated Nov. 5, 2021 from corresponding GB Patent Application No. 1909917.5.
International Search Report dated Sep. 9, 2020 from corresponding International Patent Application PCT/GB2020/000060, pages.
Written Opinion dated Sep. 9, 2020 from corresponding International Patent Application PCT/GB2020/000060, pages.
Greenberg, Joel A.; "Coded apertures for faster x-ray scatter imaging", SPIE Newsroom, Aug. 10, 2016, pp. 1-4, XP055480994.
Changping Wang, Fuging Xiao; Qianshan Chen, Shihong Wang, Jun Zhou and Zhaoyang Wu; "A two-dimensional photonic crystal hydrogel biosensor for colorimetric detection of penicillin G and penicillinase inhibitors"; DOI: 10.1039/D0AN01946A (Paper) Analyst, 2021, 146, 502-508.
UK Search Report dated Nov. 26, 2019 from corresponding GB Patent Application No. 1909917.5.

\* cited by examiner

SAMPLE INSPECTION SYSTEM COMPRISING A BEAM FORMER TO PROJECT A POLYGONAL SHELL BEAM

CROSS-REFERENCE TO RELATED APPLICATIONS

This application is a national stage application, filed under 35 U.S.C. § 371, of International Patent Application No. PCT/GB2020/000060, filed on Jun. 16, 2020, which claims priority to Great Britain Patent Application 1909917.5, filed on Jul. 10, 2019, the entire contents of each of which is incorporated by reference herein in its entirety.

TECHNICAL FIELD

The disclosure relates to a sample inspection system and in particular a sample inspection system using a polygonal shell beam formed of a plurality of walls of electromagnetic radiation.

BACKGROUND

Practical real-world security scanning systems as used in airports or post rooms (mail screening of letters and parcels e.g. detection of dangerous drugs like fentanyl) and other environments where security screening is needed require a fast and reliable way of detecting unwanted and potentially life-threatening items.

X-rays interact with matter through different processes including absorption, elastic (Rayleigh or Thomson) and inelastic (Compton) scattering processes. Absorption based techniques, such as dual-energy X-ray computed tomography, establish average atomic number and density but does not provide structural information and material phase identification via d-spacings, which ultimately limits the probability of detection and increases the false alarm rate.

In an elastic scattering process, an outgoing X-ray has the same wavelength as an incoming X-ray and so a diffraction pattern produced by the scattered radiation can be used to determine the lattice structure and thus material identity of the matter of the sample which is under inspection. This technique is commonly referred to as X-ray crystallography and may be used to identify the nature of a material or a chemical present in an inspected object with a high degree of accuracy.

As described in WO2018/154308, conical shell X-ray beams may be used to measure X-ray scatter and facilitate the calculation a sample's material parameters. However, systems employing conical shell X-ray beams combined with diffracted flux grids (with a constant diffracted flux collection angle) require relatively high energies and can only identify a limited range of d-spacing over the inspection volume. For example, luggage screening requires a minimum X-ray energy of about 80 keV for sufficient penetration of potential clutter around threat materials such as explosives and contraband narcotics. While X-rays much less energetic than 80 keV will provide adequate penetration for common luggage presentations involving for example; clothing, plastics, paper, and food stuffs, a threat material may be relatively thick and or shielded by a denser material. This type of threat would trigger a dark alarm or shield alarm necessitating a manual search. However, such hand-searches are highly disruptive and costly. It is also critical to limit the risk of security staff tasked with hand searching disguised explosive devices such as improvised explosive devices (IEDs) or highly toxic materials such as fentanyl. A polychromatic source coupled to a mask configured to produce a conical shell beam with a half-opening angle of two degrees combined with a grid that collects diffracted flux parallel with the propagation or symmetry axis of the beam requires an operational spectral range from around 51 keV to 355 keV to support the calculation of a d-spacing range from 1 angstrom (Å) to 7 Å respectively. The X-ray generator required to provide this operational range exceeds the capabilities of X-ray generators commonly incorporated into commercially available screening systems for luggage inspection. As the maximum energy of the generator increases, the resultant machine requires additional radiological shielding, which makes it larger, heavier and considerably more expensive to produce.

It is an object of the disclosure to address one or more of the above-mentioned limitations.

SUMMARY OF THE DISCLOSURE

According to a first aspect of the disclosure, there is provided an apparatus for use with a source of electromagnetic radiation, the apparatus comprising: a beam former adapted to receive electromagnetic radiation from the source to provide a polygonal shell beam formed of at least three walls of electromagnetic radiation; a collimator comprising a plurality of channels; each channel being adapted to receive diffracted or scattered radiation at an angle and an energy resolving detector arranged to detect radiation diffracted or scattered by a sample upon incidence of the polygonal shell beam onto the sample and transmitted by the collimator.

Optionally, the beam former comprises a slit having a shape, wherein the slit shape has an order of rotational symmetry that is finite and equal or greater than two.

Optionally, the slit shape forms a frustum of a pyramid with a polygonal base.

Optionally, the slit shape comprises an extended slit portion along one side of the frustum to generate a fan beam that shares a wall with the polygonal shell beam.

Optionally, the beam former comprises a plurality of slits.

Optionally, the beam former comprises a first set of slits distributed along a first axis and a second set of slits distributed along a second axis, the first axis being substantially parallel to the second axis.

Optionally, the collimator extends along a longitudinal axis, and the collimator forms a hollow region along the longitudinal axis. For instance, the hollow region may have a rectangular profile or a square profile.

Optionally, the polygonal shell beam has a characteristic propagation axis associated with it.

Optionally, the collimator is provided along the characteristic propagation axis of the polygonal shell beam.

Optionally, the apparatus comprises a plurality of collimators, each collimator being arranged to collect diffracted or scattered flux arising from different regions of the polygonal shell beam.

Optionally, the energy resolving detector may be spatially resolved. For example, the energy resolving detector may be a pixelated energy resolving detector.

Optionally, the apparatus is a retrofit device adapted to be retrofitted with a sample inspection system.

According to a second aspect of the disclosure, there is provided a sample inspection system comprising a source of electromagnetic radiation and an apparatus as claimed in any of the preceding claims. For example, the source of electromagnetic radiation comprises at least one of a polychromatic source, a narrowband source and a monochromatic source.

Optionally, the source of electromagnetic radiation comprises a source of ionizing radiation.

Optionally, the sample inspection system comprises a platform adapted to receive the sample. The platform may be movable, for instance the platform may comprise a conveyor belt.

Optionally, the sample inspection system comprises a fan-shaped beam former for generating a fan-shaped beam; and an absorption detector adapted to detect X-ray absorption of the fan-shaped beam through the sample.

Optionally, the absorption detector is a linear detector having a detection surface limited by a first longitudinal side and a second longitudinal side, wherein the apparatus comprises a first collimator and a second collimator, the first collimator being arranged on the first side and the second collimator being arranged on the second side of the absorption detector.

Optionally, the sample inspection system comprises a calculator configured to calculate a parameter of the sample based on the detected diffracted radiation; wherein the parameter comprises a lattice spacing of the sample.

Optionally, the source of electromagnetic radiation is a polychromatic source, and the calculator is adapted to calculate a range of lattice spacings of the sample.

Optionally, the calculator is configured to perform image reconstruction. For instance, the calculator may be adapted to perform limited angle tomography.

The sample inspection system according to the second aspect may comprise any of the features described above in relation to the apparatus according to the first aspect of the disclosure.

According to a third aspect of the disclosure, there is provided a method of identifying a sample, the method comprising providing a polygonal shell beam formed of at least three walls of electromagnetic radiation; collecting radiation diffracted or scattered by the sample using a plurality of channels; each channel being adapted to receive diffracted or scattered radiation at an angle, and detecting the radiation diffracted or scattered by the sample.

Optionally, the method comprises calculating a parameter of the sample based on the detected diffracted radiation; wherein the parameter comprises a lattice spacing of the sample.

Optionally, the method comprises collecting the diffracted or scattered radiation at a maximum angle, wherein the maximum angle arises from an incident ray propagating along an edge of the polygonal shell beam.

Optionally, the method comprises collecting the diffracted or scattered radiation at a minimum angle, wherein the minimum angle arises from an incident ray propagating along a slant height of the polygonal shell beam.

Optionally, the method comprises collecting at a first time diffracted or scattered radiation arising from a first interaction of the sample with a first wall of the polygonal shell beam, and collecting at a second time diffracted or scattered radiation arising from a second interaction of the sample with a second wall of the polygonal shell beam, and integrating the radiation collected at the first time and the second time.

Optionally, the method comprises translating the sample along a translation axis, the translation axis being coplanar with a wall among the at least three walls of the polygonal shell beam, collecting diffracted or scattered radiation arising from a plurality of interactions points of the sample with the said wall upon translation, and integrating the radiation collected at each interaction point.

For instance radiation may be collected from a same point on the sample and arising from different relative positions of the sample along the wall.

The method according to the third aspect may share features of the first and second aspects, as noted above and herein.

DESCRIPTION

The disclosure is described in further detail below by way of example and with reference to the accompanying drawings, in which.

Figures 12A, 12B:
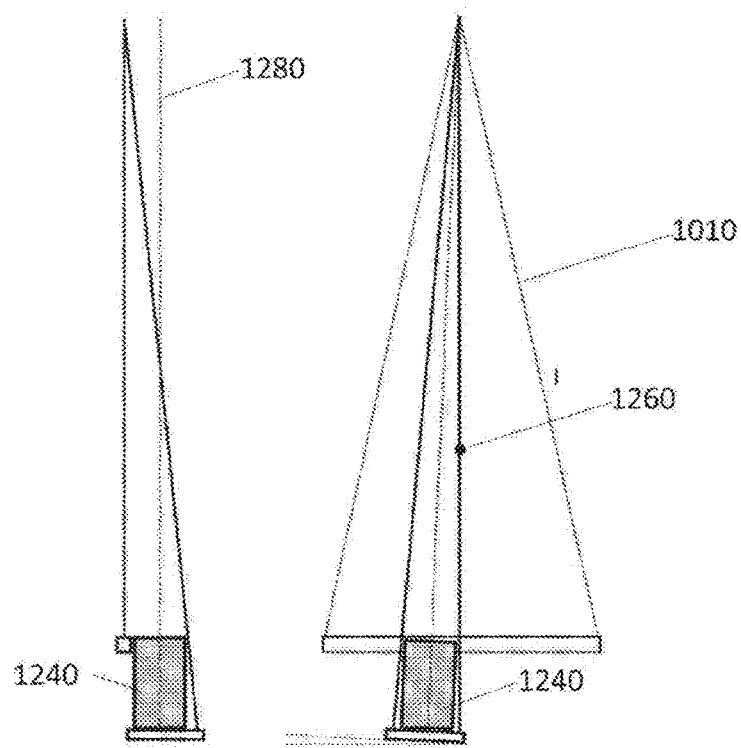
Figure 13:
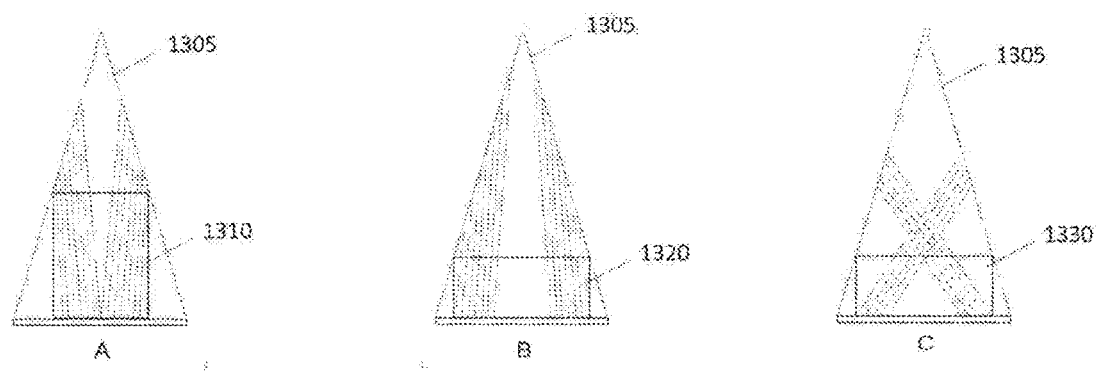
Figure 14:
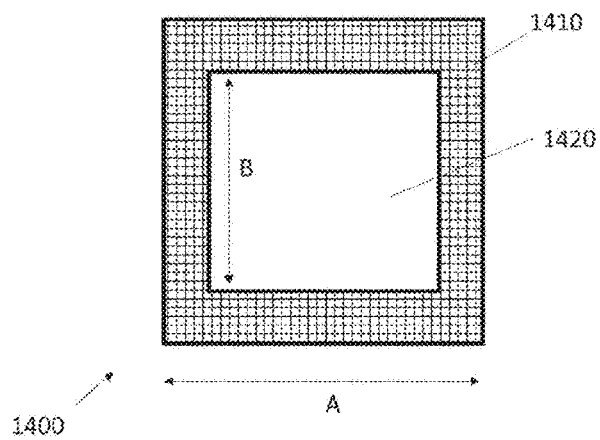
Figure 15:
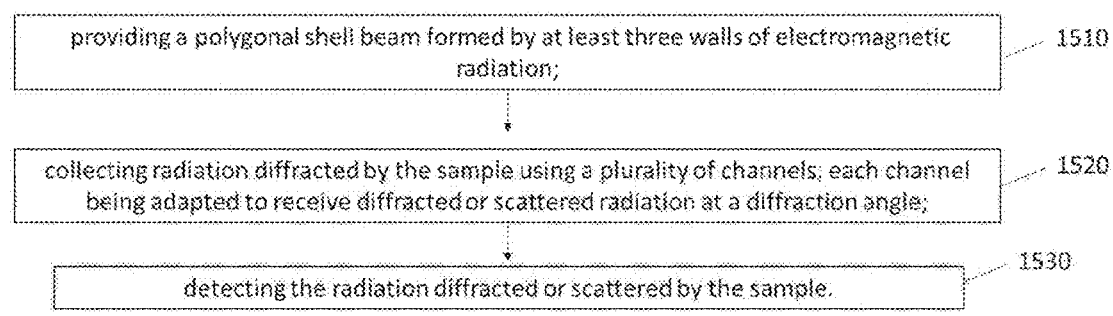

FIGS. 12(a) and (b) is another embodiment of a CT scanner in which a single collimator is used;

FIG. 13 is a diagram of three collimators designed for collecting diffracted flux at three different 2θ angles;

FIG. 14 is a top view of a hollow collimator;

FIG. 15 is a flow diagram of a method for identifying a sample.

Figure 1A:
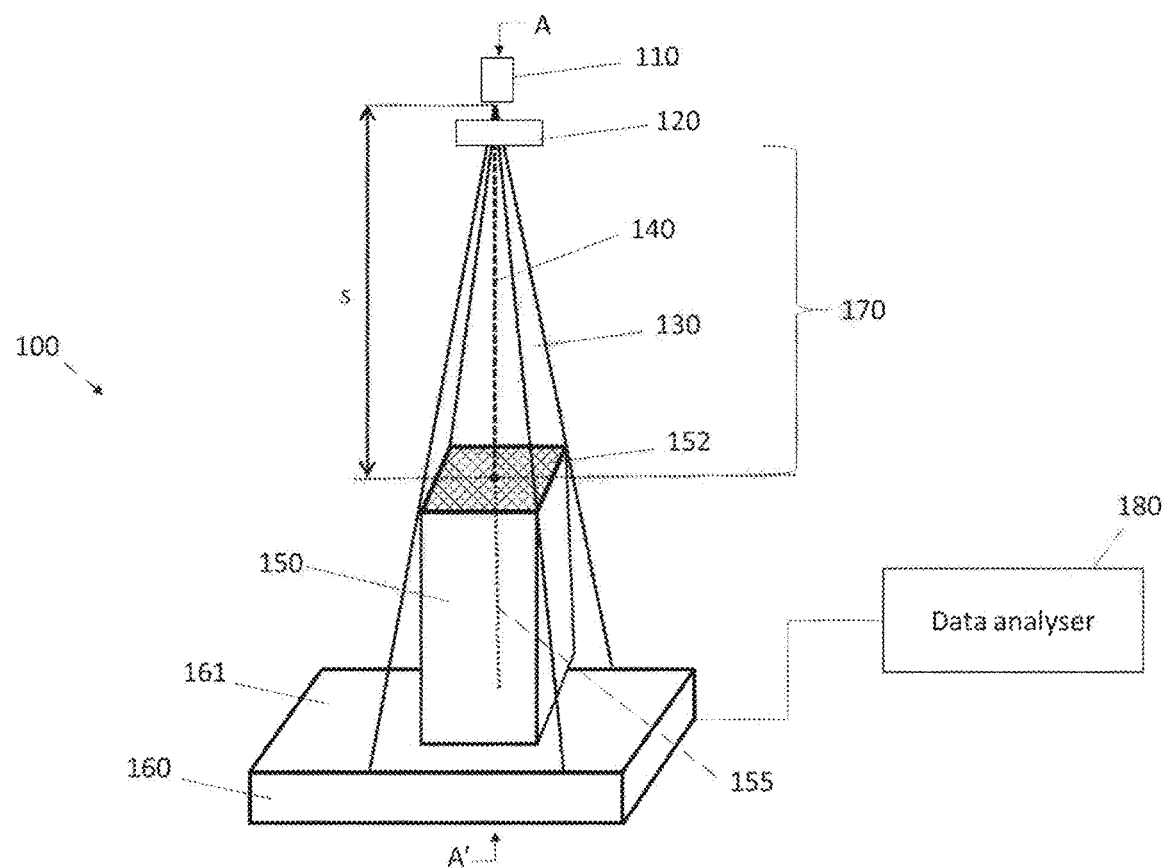
FIG. 1(a) is a diagram of a sample detection system implementing a pyramidal shell beam.

FIG. 1(a) is a diagram of a sample detection system 100. The system 100 includes an electromagnetic EM source 110 such as an X-ray point source aligned with a mask or beam former 120 for forming a polygonal shell beam 130 having a plurality of flat walls of X-ray radiation. A polygonal shell beam (130) has a three-dimensional shape formed by at least three walls of electromagnetic radiation, each wall being relatively thin in the direction perpendicular to its surface. The polygonal shell beam forms a continuous two-dimensional profile of incident radiation on a plane normal to the direction of propagation of the beam. In this example the polygonal shell beam 130 is a pyramidal shell beam having four flat walls. The polygonal shell beam 130 is a hollow beam, hence without X-ray radiation between its walls.

The electromagnetic EM radiation source 110 may be adapted to provide high-energy electromagnetic radiations. The high EM radiations may include ionizing radiations such as X-ray or gamma-ray radiations. For example, the high-energy EM radiations may have photons of energy greater than about 1 keV. The high-energy EM radiations may be hard X-ray radiations having photons of energy greater than about 10 keV. For example, the electromagnetic EM source 110 may include an X-ray source for providing X-rays having an energy in the region of up to 200 keV or more. Dependent upon the application (e.g. bulk mail and parcel screening, air cargo security screening, entire vehicle and cargo screening) high-energy (MeV) X-rays from a linear accelerator (LINAC), Betatron (compact circular electron accelerators producing a high-energy range X-Ray beam round 2 MeV to 10 MeV) or gamma radiation from a Cobalt-60 ($^{60}$Co) source may be utilised. The electromagnetic EM source 110 may be a polychromatic source or a monochromatic source of EM radiation. A monochromatic shell beam would enable the detection of a single or narrow band of d-spacings, while a polychromatic source would establish the presence of a potential range of d-spacings within the sample. The mask 120 may be formed by a solid body made of a radiopaque material provided with a shaped slit. Example of radiopaque materials that can block X-rays include tungsten or alloys made of steel and lead or from combinations of these materials. In the example of FIG. 1, the mask 120 has a square-shaped slit for forming the polygonal shell beam 130. The mask 120 may also be extended in three-dimensions to support a slit in the shape of a frustum of a pyramid.

Figure 1B:
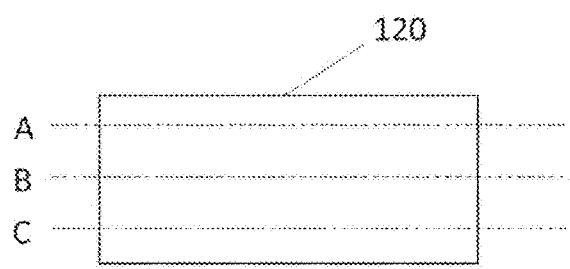
FIG. 1(b) is a side view of a mask for producing a pyramidal shell beam.
Figure 1C:
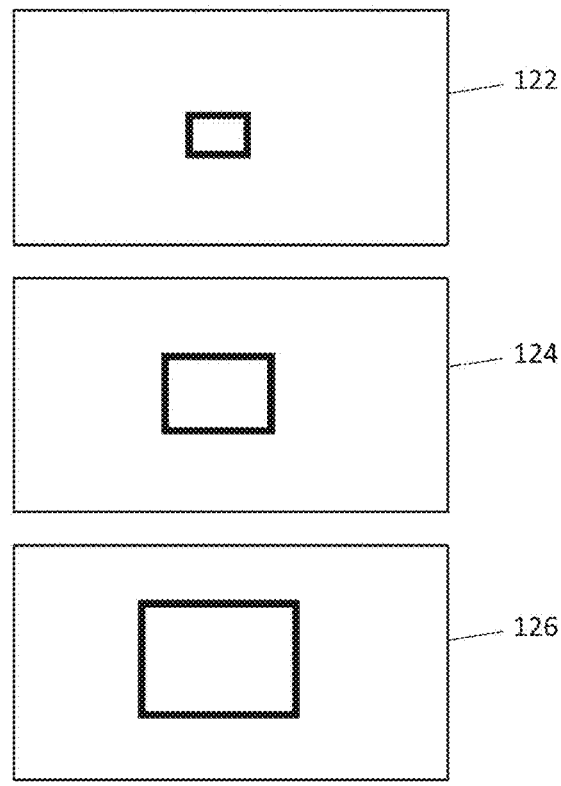
FIG. 1(c) is a series of three cross sectional views of the mask of FIG. 1(b)

FIG. 1(b) shows a side view of the mask 120 extending in three-dimensions to support a slit in the shape of a frustum of a pyramid for generating a four-sided pyramidal shell beam. Three cross sections labelled A, B and C across the mask 120 are represented in which cross section A is close to the input surface of the mask 120 facing the electromagnetic EM source 110, cross section C is close to the output surface of the mask 120 facing the collimator, and cross section B is in a middle region of the mask 120. FIG. 1(c) illustrates the slit profiles 122, 124 and 126 obtained for the cross sections A, B and C respectively.

The mask 120 may be positioned such that the projection of the pyramidal slit forms an apex at the point X-ray source. This high-aspect ratio collimation arrangement reduces the presence of parasitic X-rays and geometric distortions or geometric unsharpness produced by the finite spot of an X-ray point source.

Referring back to FIG. 1(a), the polygonal shell beam 130 propagates along a characteristic transmission axis 140. A collimator 150 is provided at a distance S from the electromagnetic EM source 110 between the mask 120 and a detector 160. The collimator 150 is elongated and provided with a longitudinal axis 155. The collimator 150 may be arranged to be concentric with the transmission axis 140, such that the input surface of the collimator 150 is substantially normal to the characteristic transmission axis 140.

The detector 160 is provided along the longitudinal axis 155 and positioned such that its detection surface 161 is substantially parallel to the output surface of the collimator 150. Alternatively, the collimator 150 may be inclined with respect to the detection surface 161 of the detector 160. The detector 160 and the collimator 150 may be coupled in different ways. For instance, the detector 160 may be in contact with the output surface of the collimator 150. Alternatively the detector 160 and the collimator 150 may be arranged such that a gap is provided between the detector 160 and the output surface of the collimator 150.

The collimator 150 has an input facing the mask 120 and an output facing the detector 160. The collimator 150 includes a plurality of channels 152 extending between its input and its output. The channels 152 have a cross section allowing the channel to be arranged in a tessellated fashion. The channels' walls may be relatively thin. For instance, the walls may be formed from suitable material to block or substantially attenuate X-ray radiation, such as tungsten or lead antimony alloy. A projection of the square-shaped outline of the slit (nearest the collimator) of the mask 120 forms a coterminous face of a rectangular parallelepiped region of the collimator 150. The central region of the collimator 150 is therefore redundant in terms of collimating scattered radiation from a sample and may be omitted in the fabrication of the collimator 150 to reduce weight and cost of materials. As a result, the collimator 150 may be designed with a hollow central region extending through its longitudinal axis. The hollow region may accommodate additional shielding to line the interior walls of the collimator. The detector 160 other than the detection surface 161 should also be shield from scattered radiation.

The coterminous edges of the collimator 150 may however collect scattered flux from the mask 120 itself to provide a useful reference pattern during the setup and alignment of the system. For instance the setup may include the alignment of the source 110, mask 120 and collimator channels 152 with the detection surface 161. In practice, the physical dimensions of the square shaped slit determine the size of the coterminous region. From a theoretical standpoint, the coterminous region may approach zero for a true point source and infinitesimal slit mask i.e. a 'pyramidal source'.

The detector 160 may be an energy resolving detector for detecting the energy of scattered photons. The energy resolving detector may be non-spatially resolving to provide an integrated signal to enable the calculation of a single composite diffractogram for the whole inspection space. Alternatively the energy resolving detector may be spatially resolving such as a pixelated energy resolving X-ray detector. In a particular embodiment, the detector 160 is a pixelated energy resolving detector and the source 110 is a broad spectrum X-ray source. Such a system permits recording depth resolved slice images or direct tomography.

The space provided between the mask 120 and the collimator 150 forms an inspection volume 170. The inspection volume 170 may be part of a much larger inspection chamber or space in which the sample detection system 100 is moved to a specific region or raster scanned over a region or rotated around and axis within the inspection chamber. The apparatus 100 includes a relatively small number of components and may be implemented as a compact system.

In operation, the shell beam 130 produces a square footprint on a plane positioned normally to the transmission axis at the input of the collimator 150. A finite solid angle subtended by a given collimator channel 152 may intersect the pyramidal shell beam 130 to form a gauge volume or volume element/voxel. When a sample, not shown, is placed within the inspection volume 170, scattered photons may be collected from a single element or a series of such elements according to the axial position of the sample within the inspection volume 170. The detector 160 measures the energy of the scattered photons at known angles of scatter.

The detector 160 can be coupled to a data analyser 180 to store and analyse the collected data. The data analyser 180 may comprise a storage medium and a processor which executes instructions for carrying out processing of the data. The instructions may be downloaded or installed from a computer-readable medium which is provided for implementing data analysis according to the disclosure.

For example, the processor may be adapted to execute an algorithm to calculate a parameter of the sample which may be used to identify the sample. For instance, the parameter may be a lattice spacing (d-spacing) of the sample. Sample identification may then be communicated to a user by a suitable display or other type of indicia such as an audible or visible alarm signal.

The processor may be adapted to run an artificial intelligence or machine learning algorithm or a deep learning algorithm for determining the d-spacing or signature of the sample based on the collected scattered signal.

Such a processor may be located in a remote server in communication with the detector. An image of an object under inspection can also be generated, hence allowing to locate the sample of interest. For instance, the diffracted X-ray flux can be used to generate an image.

In FIG. 1(a), the pyramidal shell beam has a square shaped base. However it will be appreciated that a pyramidal shell beam with a rectangular shape beam may also be used. In this scenario multiple collimators may be used side by side to accommodate the geometry of the pyramidal shell beam. The multiple collimators may be physically in contact with each other or could also be distributed along an axis with a gap between each collimator. A single energy resolving detector may be provided to measure the scattered photons collected by the plurality of collectors. Alternatively each collector may be provided with its own detector or a series of detectors. In addition, a series of detectors may be tiled to form a tessellated or continuous detection region.

Figure 2:
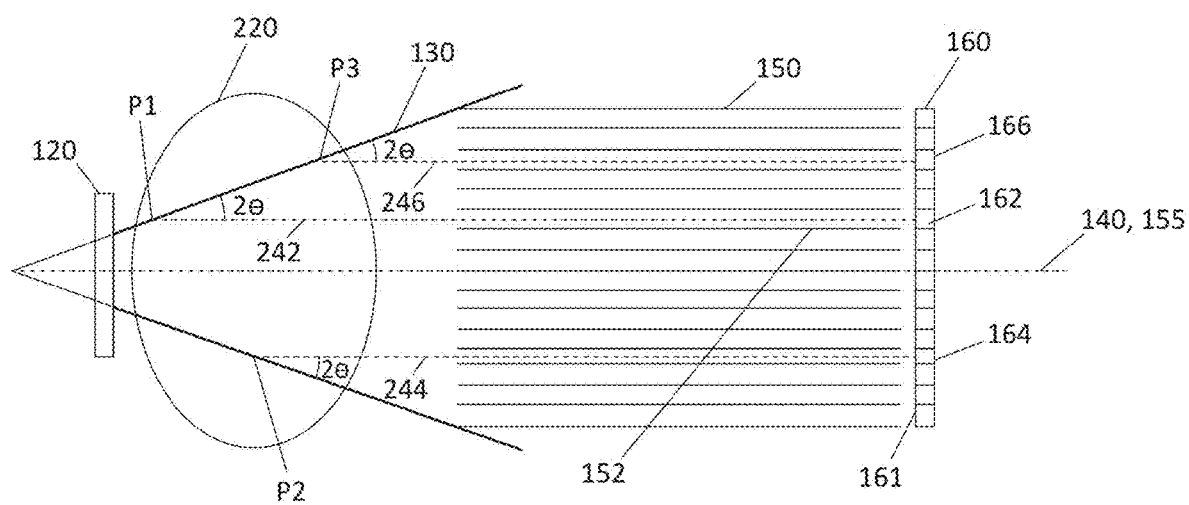
FIG. 2 is a sectional view of the system of FIG. 1(a)

FIG. 2 shows a cross section of the system 100 of FIG. 1(a) along a line A-A'. A sample 220 is positioned between the mask 120 and the collimator 150. The shell beam 130 interacts with the sample 220 at multiple scattering points.

For instance at point P1 the sample provides a scattered ray 242 which is transmitted to a portion or pixel (sampling region) 162 of the energy resolving detector 160. The scattered rays 242, 244 and 246 arising from P1, P2 and P3 can reach the detector 160, while other beams scattered with different angles are prevented from reaching the detector. The collimator 150 therefore constrains the incidence of electromagnetic radiation onto the detector 160, which only collects data arising from a particular angle of scatter. Depending on the nature of the sample, the EM radiation may be a diffracted beam at the diffraction angle two-theta ($2\theta$). The two-theta angle is the angle between an incident X-ray beam and the diffracted X-ray. The two-theta angle at which scattered photons are collected by each collimator channel is determined by the angle subtended by the longitudinal axis of the collimator channel and the polygonal shell beam. The collimator 150 collects diffracted flux propagating normal to the detection surface, therefore the opening angle of the shell beam determines the two-theta angle in this case. In FIG. 2 the two-theta angle is equal to the half opening angle of the polygonal shell beam because the long axis of the collimator is parallel with the symmetry axis of the beam and normal to the detection surface. The orientation of the collimator 150 and the detector 160 with respect to the transmission axis 140 may be adjusted to maximise the detected signal. Assuming an extended sample across a full incident footprint, the energy profile of the diffracted flux for each d-spacing is nominally independent of its position along the propagation axis. This facilitates the identification of material parameters by virtue of the reduced problem search space.

Figure 3:
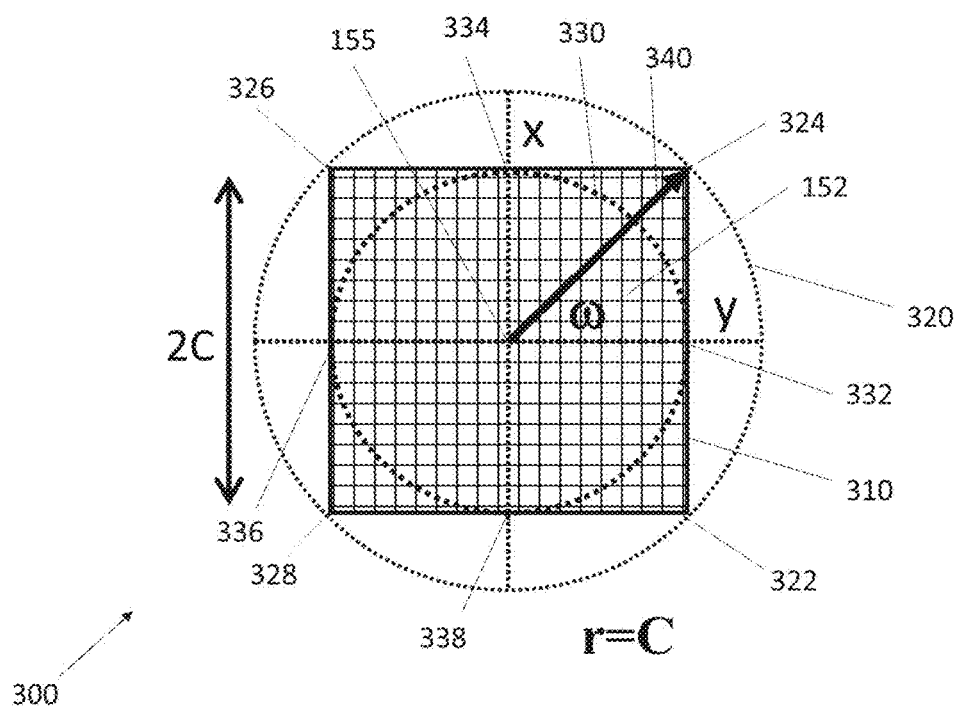
FIG. 3 is a projection produced by the pyramidal shell beam of FIG. 1(a) onto an X-ray collimator.

FIG. 3 is a top view 300 of the collimator 150 illustrating the square projection or footprint 310 produced by the pyramidal shell beam 130 when the collimator 150 is placed at a distance S from the EM source 110. The footprint 310 is a square of length 2C.

The longitudinal axis 155 of the collimator 150 intersects the input and output planes of the collimator. The point of intersection between the longitudinal axis 155 and the input plane is at the origin of a Cartesian coordinate system in which the x and y axes partition the input collimator plane into four quadrants. An origin centred square of side 2C is given by $\max(|x|, |y|)=C$, and equivalently by:

$|x|=C, 0 \le |y| \le C$ $|y|=C, 0 \le |x| \le C$

The square footprint has four corners 322, 324, 326, 328 and four mid points provided in the middle of each side 332, 334, 336, 338. An outer circle 320 passes by the four corners and has a radius $r1=r\sqrt{2}$, with $r=C$. An inner circle 330 passes by the four mid points and has a radius defined by $r2=r=C$. As a result $\Delta r=r1-r2=r(\sqrt{2}-1)$. The method of identifying maximum and minimum radii via outer and inner concentric circles (where the circle centres are coincident with the detection surface normal which intersects the point source) is applicable to a beam of any shape, including smooth or discontinuous profiles or footprints. For example, in the case of an inclined or tilted beam then the footprint in the detection plane will be offset (assuming the detection plane is not tilted) with respect to the bounding circles as the circle centre may fall outside the beam footprint on the detection plane.

As shown in FIG. 2, the detection surface 161 of the detector 160 is normal to the propagation axis 140. Only scattered/diffracted photons that subtend a constant angle $2\theta$ with a primary ray of the shell beam 130 are allowed to be incident upon the detection surface. Thus the incident photons collected from a sample form a linear or radial locus along the projection of that primary ray onto the Cartesian x, y or detection plane. For example, the vector 340 in FIG. 3 shows the projection (defined by a radius and a direction ω) of a primary ray that propagates along an edge of the pyramidal shell beam. Diffracted photons are able to propagate from a sample at a constant two-theta 20 angle along collimator channels normal to the detector to form a locus along the directions ω and by symmetry, ω+π (as well as the other diagonal; ω+π/2, ω+3π/2) to trace a diagonal line that bisects, corner-to-corner, the square input face of the collimator. This construct defines a cross-section through the primary beam from which diffracted photons may be collected at a maximum diffraction angle via the collimator channels normal to the detector. Any cross section coincident with axis 140 will provide a constant two-theta collection angle. The loci may be truncated about the origin of the Cartesian plane due to the construction and configuration of the collimator 120 as explained by the projection of the mask 120 onto the collimator 150.

The implementation of a 2θ range enables an increase in the calculable range of d-spacing values for a specified X-ray energy range or window. This is an important consideration in practice as the lower and upper bounds of the operational energy window are dependent upon both system and application specific limitations. For example, in security screening of luggage or cargo the minimum X-ray energy required to penetrate fully the potential range of objects and clutter within the inspection volume gives the low-energy operational limit. In addition, the useable high-energy limit of the spectrum is a function of the amount of flux generated by the X-ray source at the operationally relevant energies. For example, the production of unfiltered X-rays by thermionic emission exhibits an approximately linear reduction in intensity of X-rays with increasing spectral energy (excepting characteristic lines) until approaching zero intensity at the acceleration voltage. Thus, measurements of relatively higher energy flux may require much longer exposure times and or result in poor signal-to-noise, which concatenates into the calculation of d-spacing values and sample specific parameters to reduce system performance and fidelity. For these reasons, a practical system requires the specification of a calculable range of d-spacings over an operationally relevant X-ray energy window.

The following examples describe the lower bound of the d-spacing range in terms of a maximum 2θ and a maximum diffracted X-ray energy. The upper d-spacing bound is established in terms of a minimum 2θ and a minimum diffracted X-ray energy.

The cross-sections arranged diagonally through the primary beam profile are coincident with the corners of the footprint that correspond to the largest radii and therefore the maximum 2θ values. In other word, the maximum 2θ angle is associated with the rays following edges of the pyramidal shell beam. The collection and measurement of diffracted flux from a sample at a maximum 2θ angle enables relatively smaller d-spacing values to be calculated (in comparison with a smaller 2θ angle) for a given maximum diffracted flux energy.

The cross-sections that partition the primary beam footprint into four quadrants intersect the beam footprint at the midpoints of its sidewalls and correspond to the smallest radii and therefore minimum 2θ values. In other word, the minimum 2θ angle is associated with the rays following the slant height of the pyramidal shell beam. The collection and measurement of diffracted flux from a sample at a minimum 2θ angle enables relatively larger d-spacing values to be calculated (in comparison with a larger 2θ angle) for a given minimum diffracted flux energy.

The relationship between d-spacing range and the energies that satisfy Bragg's condition is given in the following analysis.

The potential diffracted photon energy range $\Delta E_{max/min}$ may be expressed for a given d-spacing as:

$$\Delta E_{max/min} = \frac{6.2}{d \sin\left(\frac{\tan^{-1}\left[\frac{r + \Delta r_{max/min}}{S}\right]}{2}\right)} \text{keV}$$

$$0 \leq \Delta r \leq r(\sqrt{2} - 1)$$

where $\Delta r_{max}$ and $\Delta r_{min}$ are the max and min linear distances from the centroid of the square beam profile (where the centroid is pierced by the transmission axis 140) to the periphery of the beam footprint along angular directions in the Cartesian plane, for example:

$$\Delta r_{max}, \omega = \frac{\pi}{4}, \frac{3\pi}{4}, \frac{5\pi}{4}, \frac{7\pi}{4} \text{ (corners)}$$

$$\Delta r_{min}, \omega = 0, \frac{\pi}{2}, \pi, \frac{3\pi}{2} \text{ (midpoints)}$$

The potential diffracted photon energy range $\Delta E_{max/min}$, also referred to as spectral response is independent of axial position (assuming an extended sample fully intersects the primary beam).

For a given d-spacing value the gradual change in radial distance to a point on the beam profile will produce a gradual change in the energy that satisfies Bragg's condition due to the associated change in the two-theta diffraction angle.

In a numerical example, a 50 mm square pyramidal system as per FIG. 1(*a*) is considered in which the pixelated detector is square and the source to input collimator face separation is 0.7 m. The outer/inner bounding circle analysis establishes the maximum and minimum two-theta values of approximately 2.9° and 2.0°, respectively. The resultant (energy, two-theta)/d-spacing parameters obtained are as follows. At the corners of the detector (radius=r√2), the energy is 180 keV for a 2θ=2.9° and the d-spacing=1.36 angstroms. At the midpoints (radius=±r), the energy is 80 keV for 2θ=2.0° and the d-spacing=4.44 angstroms. The d-spacing difference Δd=4.44−1.36=3.08 angstroms. In comparison, a conical shell beam of diameter 2r√2 with the same source to input collimator face separation provides (180 keV, 2.9°) 1.36 angstroms and (80 keV, 2.9°) 3.07 angstroms resulting in Δd=3.07−1.36=1.71 angstroms.

In another numerical example, a 2:1 (100 mm×50 mm) rectangular pyramidal system is considered. The system employs two tiled pixelated detectors with a source to input collimator face separation of 1.13 m. The outer/inner bounding circles provide maximum and minimum two-theta values of approximately 2.83° and 1.27°, respectively. The maximum and minimum radii (r√5, r) result in an (energy, two-theta)/d-spacing (180 keV, 2.83°) 1.4 angstroms (r√5 at the corners of the detector) and (80 keV, 1.27°) 7.0 angstroms (±r along the y-axis on the detector) Δd=7.0−1.4=5.6 angstroms. In comparison, a conical shell beam of diameter 2r√5 with the same source to input collimator face separation provides (180 keV, 2.83°) 1.4 angstroms and (80 keV, 2.83°) 3.1 angstroms resulting in Δd=3.1−1.4=1.7 angstroms.

Figure 4A:
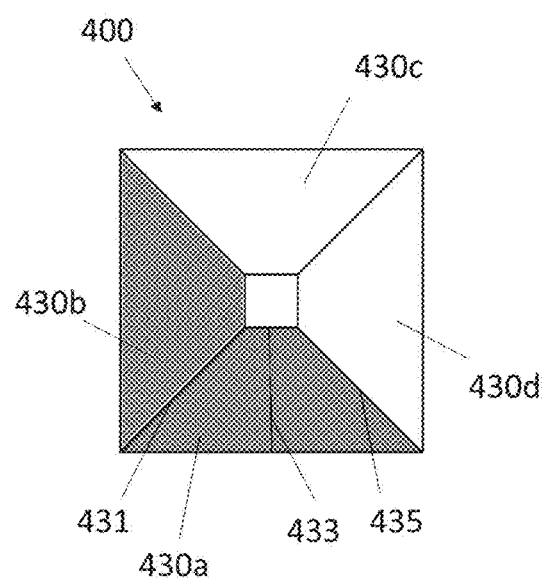
FIG. 4(a) is a top view of a four-sided pyramidal shell beam.

FIG. 4(a) is a top view of a pyramidal shell beam 400 formed by four planar walls of electromagnetic radiation, also referred to as fan-shaped beams 430a, 430b, 430c and 430d. Each planar wall has a triangular shape or truncated triangular shape. The planar walls are connected to each other to form the pyramidal shell beam. In this example the wall 430a has one side contiguous to the wall 430b and another side contiguous to the wall 430d. Similarly, the wall 430c has one side contiguous to the wall 430b and another side contiguous to the wall 430d. The polygonal shell beam is characterised by a base having a closed shape defined by the number of segments present in the polygon. In this case the base of the pyramidal shell beam has a square shape. Each wall is formed by a plurality of individual X-rays in the plane of the wall, also referred to as primary ray paths. The primary ray path 431 is provided along the edge of the pyramidal shell beam at the intersect of the walls 430a and 430b. Similarly the primary ray path 435 is provided along another edge of the pyramidal shell beam at the intersect of the walls 430a and 430d. Between paths 431 and path 435, the primary ray path 433 is provided along the slant height of the pyramidal shell beam.

Figures 4B, 4C:
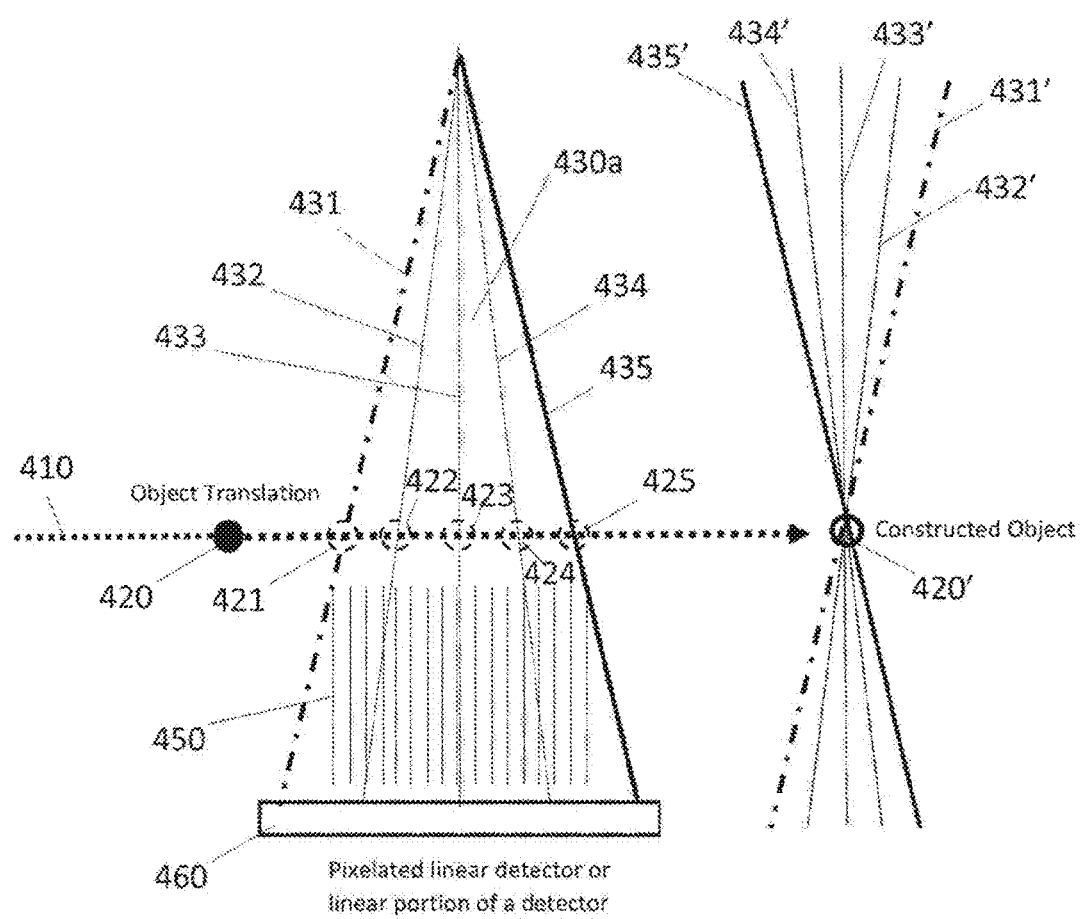
FIG. 4(b) is a representation of a sample portion translated along an axis coplanar with a wall of the pyramidal shell beam of FIG. 4(a)
FIG. 4(c) is a representation of five arbitrary primary ray paths, passing through the sample portion of FIG. 4(b) at different times during sample translation.

FIG. 4(b) illustrates a point or portion 420 of a sample that is translated along an axis 410 which is coplanar with the wall of electromagnetic radiation 430a. The wall 430a is formed by a plurality of primary ray paths in the plane of the wall. Five primary ray paths labelled 431-435 are represented. Each primary ray path passes through the sample portion 420 at different times during the translation. For instance, at time t0 the sample portion 420 interacts with the primary ray path 431, as shown by dotted circle 421. At time t1 the sample portion 420 interacts with the primary ray path 432, as shown by dotted circle 422 and so on. The x, y, z spatiotemporal relationship may be calculated from the relative velocity v of the sample portion and the fixed geometric relationship between the solid angle of the collimator channels and their corresponding intersection with the primary beam along which the sample moved. Each collimator channel and optically coupled detector element is sampled at a set frequency. Therefore, a stream of quantized samples may be correlated spatially with the scanned volume. For example, the linear displacement during each pixel snapshot is given by v/f=δx where f is the detector scan frequency and δx is the minimum increment along the movement or x-axis. The relative registration of the pixel stream may be changed or shifted to effect a spatiotemporal convergence. A focal plane may be established by reregistering multiple linear views through the sample feature of interest such that they overlap in a resultant summed or processed image. This data collection and registration process is an example of direct tomography (spatially resolved by direct measurement) in which multiple linear views are summed to improve sensitivity and specificity.

The linear footprint of the beam wall 430a in the Cartesian plane is along the direction of relative sample translation shown by axis 410. Therefore, during translation, the sample portion 420 is interrogated by a contiguous set of rays forming a pyramidal wall. The total number of contiguous primary beam ray paths is determined by the opening angle of the pyramidal shell beam 400. For instance the sample portion 420 is interrogated by the primary ray path 431 belonging to wall 430b and the primary ray path 435 belonging to wall 430d. In practice the row of collimator channels stare at a nominally linear portion of the beam wall that is coincident with the trajectory of the sample portion moving parallel with (and contained between) the inner and outer bounds of a pyramidal wall. Scattered X-ray photons collected from the object portion are collected over a range of incident angles determined by the opening angle of the fan beam.

The scattered X-ray signal collected by the pixilated X-ray detector 460 via the collimator 450 may be analysed to obtain depth-resolved images. Collimator channels concentric with a polygonal primary beam are able to collect diffracted flux at a specific range from the X-ray source. Each concentric set of polygonal collimator channels enables a pixelated detector (assuming at least one pixel per channel) to spatially resolve diffracted flux in a staring or relatively stationary mode of operation. In addition, each collimator channel and optically coupled detection pixel may collect diffracted photons during the relative translation of a sample or scan. Each channel measures flux at a calculable position (x, y, z) during a scan and can be used to render volume elements composing part of a volumetric image or data-cube for further analysis and visualizations.

A series of depth-resolved slice images (parallel with the detection plane) can be collected by measuring diffracted flux from samples translating through the beam encountered first during a scan also referred to as front wall. A different, but similar series of slice images may also be collected and stored by measuring diffracted flux from samples translating through the beam encountered last during the scan also referred to as rear wall.

Corresponding pairs of coplanar slice images, one from the front beam and one from the back beam, are comprised of diffracted flux measurements from primary rays propagating along different directions through the sample plane (i.e. as determined by the front and rear beams). The advantage of collecting two images of the same object slice using these different beam directions is the reduction in the deleterious effects of cluttering objects above and below the slice plane. Thus, relatively poor or low intensity measurements of diffracted flux from a sample interrogated by one of the beams can be compensated by measurements from the other beam. In this way a dual-view or double interrogation can help mitigate the effects obfuscating objects/materials in shielding threats due to stream-of-commerce clutter occurring differentially in each sample/beam. For example, two different coplanar slices may be spatiotemporally registered and summed or combined to produce a composite signal or image with improved signal-to-noise ratio. The threat may only appear either the front or the rear image.

FIG. 4(c) shows the equivalence between illuminating simultaneously a point from different coplanar directions, and the coplanar translation of a point through a fan beam in which the same ray directions occur, in sequence, over the scan period. In FIG. 4(c) the sample 420' is probed by five rays 431'-435' at different incidence angles. This is equivalent to the sample 420 being translated along axis 410 through the wall 430a as shown in FIG. 4(b).

The collection of diffracted flux from an in-plane relative rotation of primary rays about a section through a sample enables the application of direct tomography and or limited angle tomography to the in-plane section.

The diffracted flux is measured for each separate ray path and can be constructed to form a single line (depth resolved) image. A contiguous series of such lines describes a slice image in the plane of the pyramidal wall. The application of tomosynthesis can help mitigate the effect of obfuscating objects or materials or clutter on a constructed sectional image as the summed signal is less dependent upon objects/ materials above and below the point of interest. Since many measurements of diffracted flux are summed from the point/object of interest, the signal-to-noise may also be improved.

Figure 4D:
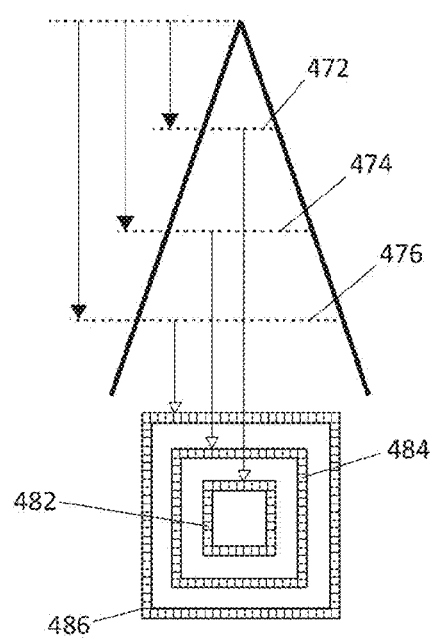
FIG. 4(d) is a diagram of three sample planes imaged onto three regions of the collimator for performing depth resolved imaging.

FIG. 4(d) illustrates three sample planes 472, 474, 476 imaged onto three square portions of the collimator 482, 484 and 486. Each square portion collects scattered or diffracted radiation from a specific plane, for performing depth resolved imaging. For instance the square portion 482 collects radiation arising from sample plane 472. Similarly, the square portion 486 collects radiation arising from sample plane 476.

Figure 4E:
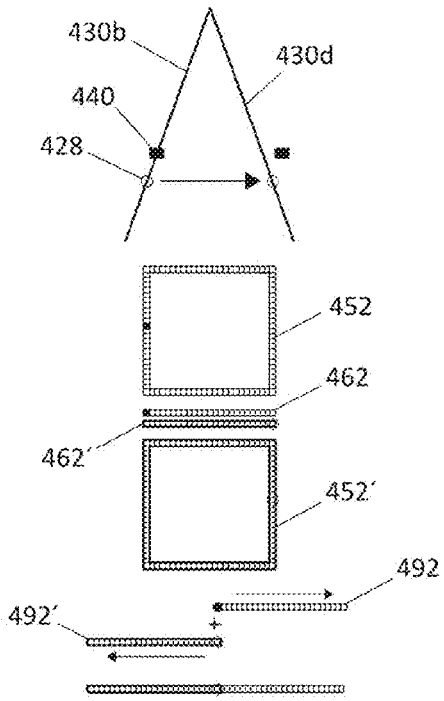
FIG. 4(e) is a representation of a sample portion translated through a front wall and a back wall of a polygonal shell beam.

FIG. 4(e) illustrates an example of depth resolved scanning. A sample portion 428 moves through a front wall 430b, a hollow region, and a back wall 430d of the polygonal shell beam. During the translation of the sample through the various regions of the polygonal shell beam, multiple snapshots are acquired by the detector 462 via the collimator 452. The references 462 and 452 represent the detector and the collimator at a time t1 when diffracted radiation arising from the front wall 430b is being detected. Similarly, the references 462' and 452' represent the detector and the collimator at a time t2=t1+dt when diffracted radiation arising from the back wall 430d is being detected. The two pixels or set of pixels (pixel streams) 492 and 492' detecting the sample portion 428 at time t1 and t2 respectively, are offset by a known number of pixels and summed. Various rays of the polygonal shell beam may be shielded by a substance or object 440. In this example, the primary beam 430b is shielded by object 440. However the primary beam 430d is not shielded by 440. Many different shielding scenarios can be envisaged, however increasing the total number of views of the sample increases the probability of detecting and identifying a sample of interest.

Figure 5A:
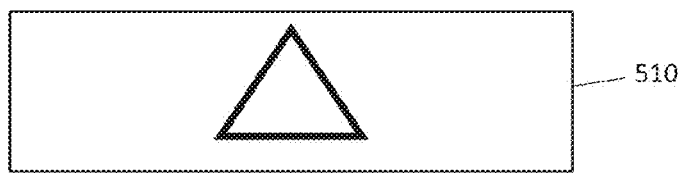
FIG. 5 (a) is a bottom view of a mask for generating a three-sided pyramidal shell beam.
FIG. 5(b) is a bottom view of a mask for generating a four-sided pyramidal shell beam.
FIG. 5(c) is a bottom view of a mask for generating a six-sided shell beam.
Figure 5B:
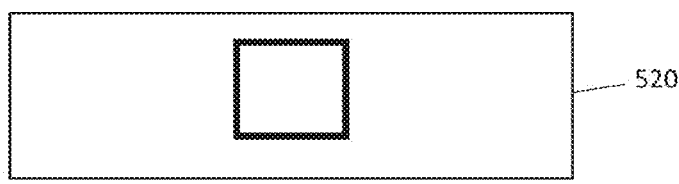
Figure 5C:
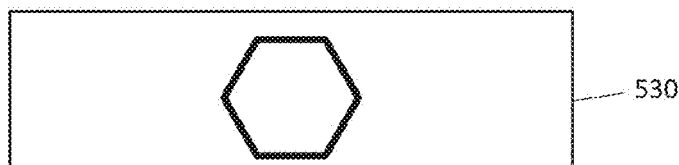

FIG. 5 illustrates different mask profiles for generating polygonal shell beams with multiple walls. The mask may be provided with a slit having a polygonal shape comprising of at least three segments or linear portions. FIG. 5(a) shows a bottom view of a mask 510 provided with a triangular-shaped slit for forming a three-sided pyramidal shell beam. The triangular-shaped slit has a degree of rotational symmetry equal to three as it appears the same when rotated by one third of a full turn about its centre. The three-sided pyramidal shell beam generated by such a slit would also have a three-fold rotational symmetry. FIG. 5(b) shows a bottom view of a mask 520 provided with a square-shaped slit for forming a four-sided pyramidal shell beam with a four-fold rotational symmetry. FIG. 5(c) illustrates a bottom view of a mask 530 provided with a hexagonal-shaped slit for forming a six-sided shell beam with a six-fold rotational symmetry. By extension, a slit having a rotational symmetry of N-fold may be used to generate an N-fold rotationally symmetric shell beam in which N is an integer equal or greater than two. A mask may be provided with multiple slits for providing multiple shell beams. For example, the multiple slits may be provided along a linear axis.

Figure 6:
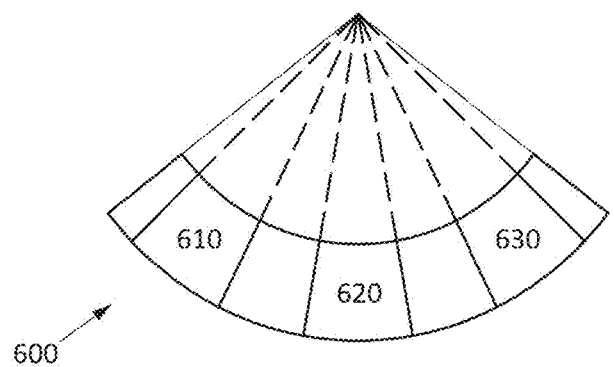
FIG. 6 is a sectional view of a mask provided with a plurality of slit profiles for generating a plurality of polygonal shell beams.

FIG. 6 is a sectional view of a mask provided with a plurality of slit profiles to generate a plurality of polygonal shell beams. In this example the mask 600 is provided with three pyramidal slit profiles 610, 620 and 630. The mask 600 has a semi-circular shaped body and the slit profiles are oriented within the body of the mask such that for each slit profile the projection of the pyramidal slit forms an apex at the point X-ray source. It will be appreciated that various modifications of the mask may be envisaged depending on the application. The type of slit profiles, the number of slit profiles, and the locations of the slits within the mask may be varied.

Figure 7A:
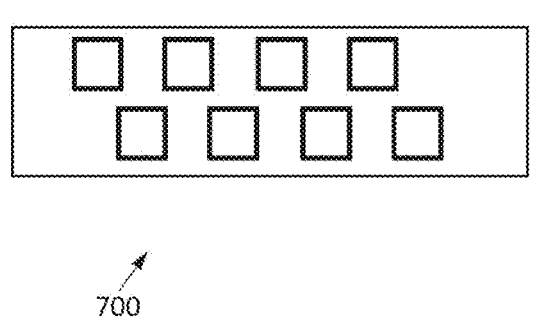
FIG. 7(a) is a mask provides with two sets of slit profiles.

FIG. 7(a) shows a mask 700 provides with two sets of slit profiles. A first series of slit profiles is provided along a first axis with a gap between each profile to form the first set. Similarly a second series of slit profiles is provided along a second axis with a gap between each profile to form the second set. The first and second axis are parallel to each other. The gaps on the first axis and the second axis are located such that a slit profile of the first axis faces a gap on the second axis, and a gap on the first axis faces a slit profile on the second axis.

Figure 7B:
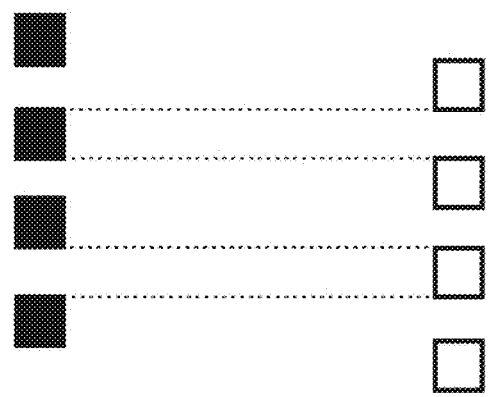
FIG. 7(b) is a diagram of the footprints generated by the mask of FIG. 7(a)

FIG. 7(b) illustrates the footprint generated by the mask of FIG. 7(a). The base of the pyramidal shell beams generated by the first set of slits are shifted with respect to the base of the pyramidal shell beams generated by the second set of slits.

Referring back to FIG. 1(a), the apparatus that includes the mask 120, the collimator 150 and the detector 160, may be packaged as a retrofit device to be used in a scanner such as a computed tomography (CT) scanner.

Figure 8A:
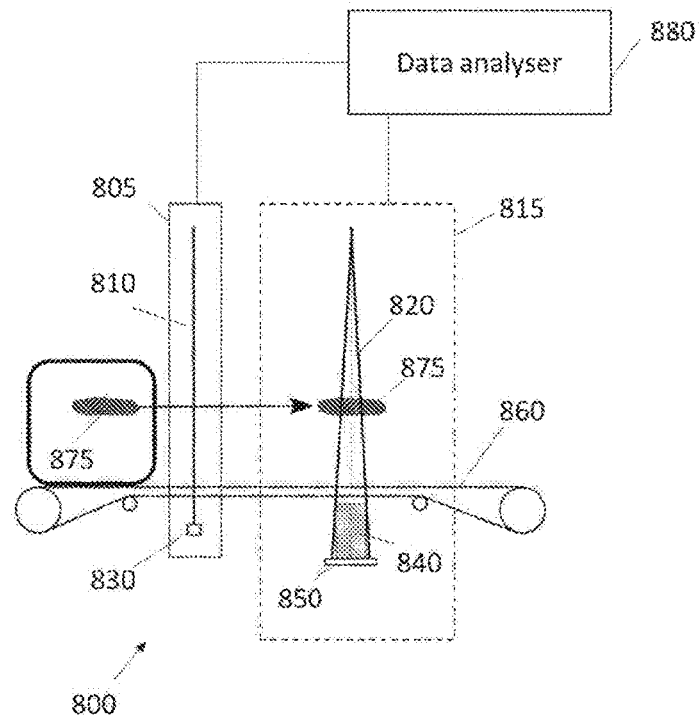
FIG. 8(a) is a side view of a scanning system provided with a pre-screening module and a false-positive checking module.
Figure 8B:
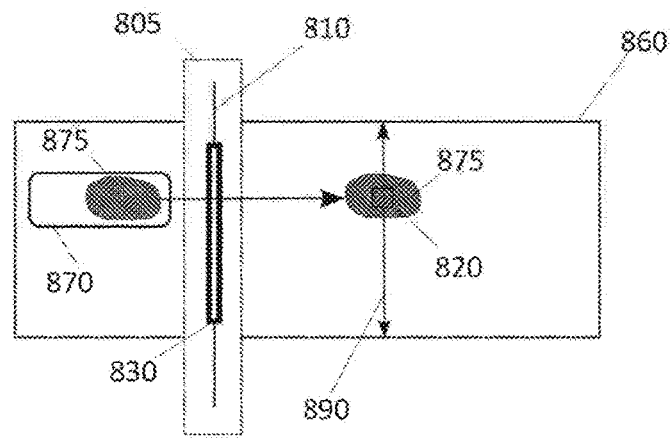
FIG. 8(b) is a top view of the scanning system of FIG. 8(a)

FIGS. 8(a) and (b) show a side view and a top view of a scanning system 800 which may be used to reduce the instances of false alarms. The system 800 is provided with a first module 805 and a second module 815. In this example the first module is a CT scanner module that includes a beam former for generating a fan shaped beam 810, and an X-ray absorption detector 830.

The second module includes another beam former for generation a pyramidal shell beam 820, a collimator 840 and an energy resolved detector 850. A platform 860 is provided to receive a container 870 such as a bag or suitcase containing an item 875. In this example the platform 860 is implemented as a conveyor belt for moving the container 870 towards a first detection area associated with the first module 805 and a second detection area associated with the second module 815. A mechanical arrangement (not shown) may be provided to translate the second module 815 along an axis 890 orthogonal to the direction of translation defined by the conveyor belt 860. A data analyser 880, coupled to the first and second modules may be provided to perform analysis of the collected data.

In operation the CT scanner module 805 scans the container 870. For instance the fan beam 810 of the CT scanner may be used at relatively high speed to scan the container 870. If the item 875 is deemed at risk, the module 805 communicates the coordinates of the item 875 to the second module 815. The second module 815 is then translated across the platform 860 to perform a secondary measurement. The pyramidal shell beam 820 may be used in a static fashion to stare or scan the region of interest based on the coordinates provided by the module 805. The first module 805 may send the coordinates either as two axial coordinates or as three axial coordinates. Two axial coordinates are sufficient for the pyramidal beam 810 to intersect the target. However, when using three axial coordinates some of the probe data located above and below the target can be ignored to improve the data analysis. Using the system 800, the second measurement provided by the second module 815 can be used to either confirm or disregard the result previously obtained by the first module 805.

The first module 805 may be provided with a dual energy X-ray detector to calculate the density of the sample under inspection. The data analyser 880 may combine this information with the scattered signal collected by the second module 815 to obtain a better analysis of the sample.

The first module 805, also referred to as pre-screening module may be implemented in different fashions. For instance, the CT scanner may be replaced with a single view or a dual view or a multiple view pre-screener that does not involve rotation and therefore can be implemented more cheaply. In an alternative embodiment the first and second modules 805 and 815 may be integrated in a single module.

Figures 9A, 9B, 9C:
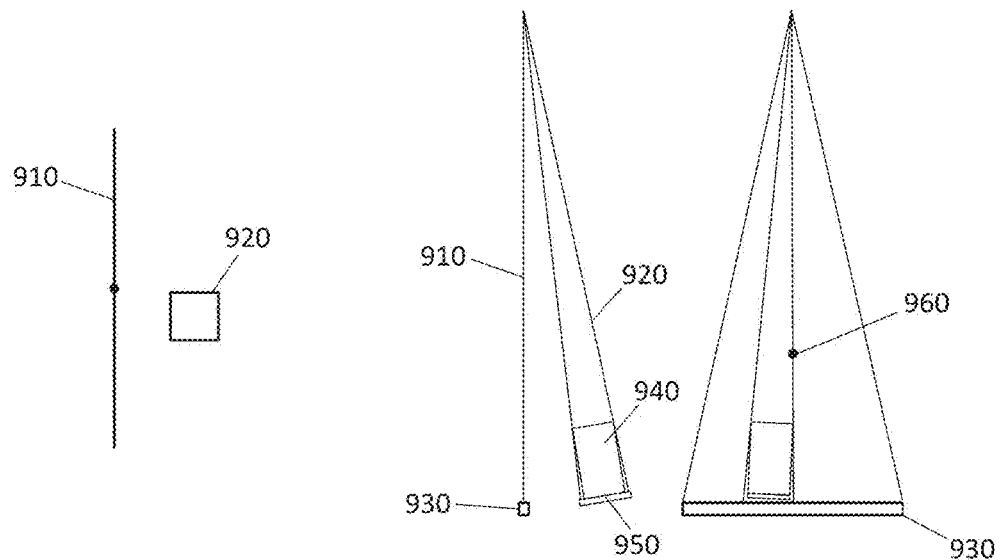
FIG. 9(a) is a footprint of a fan beam and a pyramidal shell beam generated by a single mask.
FIG. 9(b) is a side view of a CT scanner fitted with a retrofit device comprising the mask, a collimator and energy detector.
FIG. 9(c) is a front view of the CT scanner of FIG. 9(b)
Figures 10A, 10B:
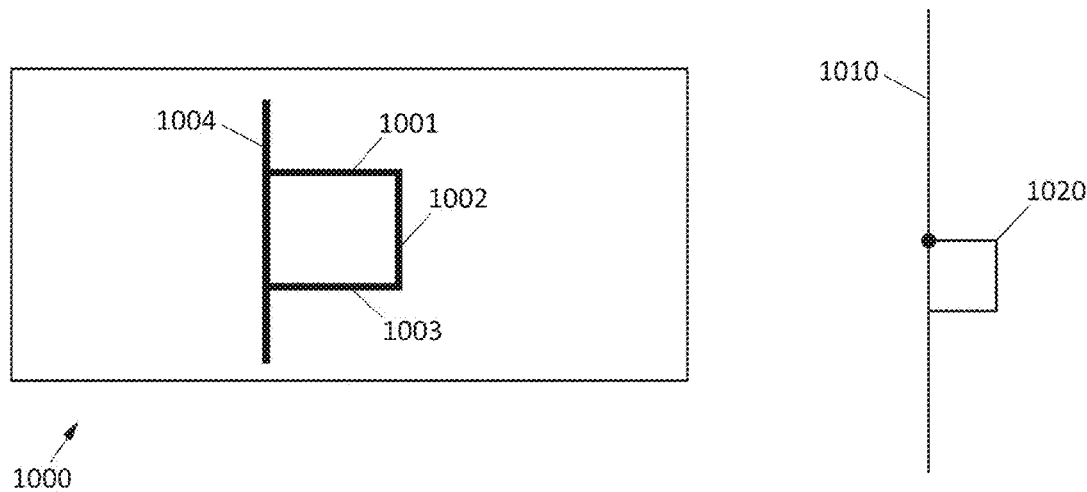
FIG. 10(a) is a mask having a slit profile for generating a fan beam and a four-sided pyramidal shell beam that shares a wall with the fan beam.
FIG. 10(b) is a diagram of the footprint generated by the mask of FIG. 10(a)
Figure 10C:
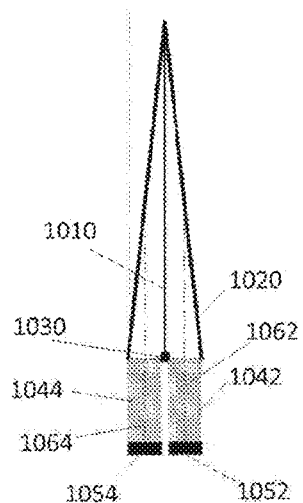
FIG. 10(c) is a side view of a CT scanner fitted with a retrofit device comprising the mask of FIG. 10(a) and two collimators/energy detectors.
Figure 10D:
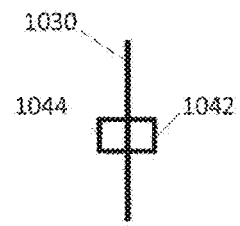
FIG. 10(d) is a top view of the absorption detector and collimators of FIG. 10(c)
Figure 10E:
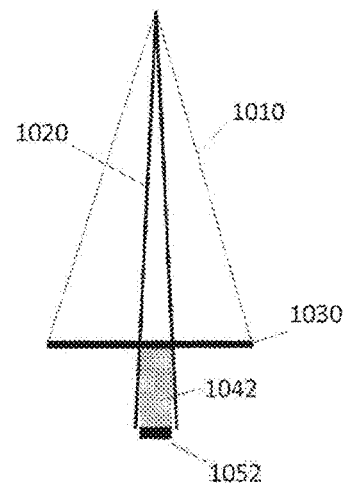
FIG. 10(e) is a front view of the CT scanner fitted of FIG. 10(c)

FIG. 9(*a*) shows a profile of incident radiation, also referred to as footprint, obtained on a plane normal to the direction of propagation of a fan beam 910 and a pyramidal shell beam 920. In this example the fan beam 910 and the pyramidal shell beam 920 are generated by a single mask, not shown. FIG. 9(*b*) is a side view of a CT scanner fitted with a retrofit device comprising the mask, a collimator 940 and energy detector 950. The fan beam 910 of the CT scanner is aligned with an absorption detector 930. FIG. 9(*c*) is a front view of the CT scanner fitted with the retrofit device. The reference 960 shows the centre of rotation of the CT scanner.

FIG. 10(*a*) shows a mask 1000 having a slit profile for generating a fan beam that shares a wall with a four-sided pyramidal shell beam. The mask 1000 is provided with a slit comprising four segments 1001, 1002, 1003 and 1004 forming a closed shape. The segments 1001, 1002, 1003 have a same length L, while the remaining segment 1004 has a length greater than L. The segments 1001, 1002, 1003 and 1004 are arranged to form a square-shaped slit having one extended side. It will be appreciated that various other polygonal slits may be used for generating a fan beam that shares a wall with a polygonal shell beam. For instance the segments 1001, 1002 and 1003 may be replaced by only two segments forming a triangular shape; or by five segments to form a hexagonal shape.

FIG. 10(*b*) shows a footprint generated by the mask 1000 when used in a scanner such as a CT scanner. The pyramidal shell beam 1020 shares a wall with the fan beam 1010. FIG. 10(*c*) is a side view of a CT scanner fitted with a retrofit device comprising the mask 1000 and two sets of collimator/energy detector labelled 1040/1052 and 1044/1054 respectively. The fan beam 1010 of the CT scanner is aligned with an absorption detector 1030. In this example, the absorption detector 1030 is a linear detector having a detection surface limited by a first longitudinal side and a second longitudinal side.

FIG. 10(*d*) is a top view of the absorption detector 1030 and collimators 1042 and 1044. The first collimator 1042 is provided next to the first side of the absorption detector 1030 along an axis 1062 parallel to the propagation axis of the fan beam 1010. Similarly, the second collimator 1044 is provided next to the second side of the absorption detector 1030 along another axis 1064 parallel to the propagation axis of the fan beam 1010. The collimators 1042 and 1044 are arranged with their input surface in a same plane below the detection surface of the absorption detector 1030. In operation the diffracted photons collected by the collimators 1042 and 1044 are parallel with the fan beam 1010. Using this arrangement, any diffracted photons arising from the fan shaped beam 1010 are not being collected by the collimators 1042 and 1044, hence preventing artefacts due to diffracted photons being detected multiple times. FIG. 10(*e*) is a front view of the CT scanner fitted with the retrofit device.

Figure 11:
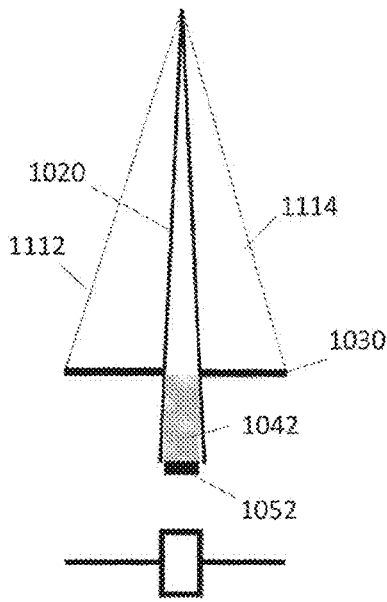
FIG. 11 is another embodiment of CT scanner an in which the fan-shaped beam is formed of two discontinuous portions.

FIG. 11 illustrates an embodiment similar to the embodiment of FIG. 10 in which the fan-shaped beam is formed of two discontinuous portions 1112 and 1114. It will be appreciated that the collimators 1042, 1044 and energy detectors 1052, 1054 described in FIGS. 10 and 11 may also be replaced by a single larger collimator and a single larger detector.

FIGS. 12(*a*) and (*b*) illustrate another embodiment in which a single collimator 1240 is used. The plane of the fan shaped wall 1010 is parallel to the propagation axis 1280 of the collimator 1240. The collimator 1240 is rotated by a small angle around an axis 1260 normal to the plane of the fan shaped beam 1010. In operation the collimator 1240 collects diffracted photons arising from the three pyramidal walls generated by segments 1001, 1002 and 1003 of the mask 1000 described in FIG. 10. Any diffracted photons arising from the fan shaped beam 1010 are not collected by the collimator 1240.

The collimator described above with respect to FIGS. 1-4 and 8-12 may be modified depending on the application. For instance, the collimator may be designed for collecting diffracted flux at a specific 2θ diffraction angle.

FIG. 13 illustrates three collimators 1310, 1320, and 1330 designed for collecting diffracted flux at three different 2θ angles using by way of example the same pyramidal shell beam. The dotted lines represent both the direction of the diffracted flux arising from a wall of incident radiation 1305 of a pyramidal shell beam, as well as the direction of the channels within the collimators.

FIG. 14 is a top view of a hollow collimator 1400 provided with a plurality of channels 1410 extending through the length of the collimator. The collimator forms a hollow central region 1420 extending along the longitudinal axis of the collimator. In this example the hollow central region 1420 has a square shape. The size B of the hollow region is determined by the maximum standoff or separation between the X-ray focus and the output face of the collimator.

FIG. 15 is a flow chart of a method for identifying a sample. At step 1510 a polygonal shell beam formed by at least three walls of electromagnetic radiation is provided. At step 1520 radiation diffracted or scattered by the sample is collimated using a plurality of channels. Each channel is adapted to receive diffracted or scattered radiation at a diffraction angle. At step 1530 the radiation diffracted or scattered by the sample is detected.

The proposed method permits to access a range of two-theta angles over the full gauge volume/inspection space. This increases the range of identifiable d-spacing for a given X-ray spectrum hence improving sensitivity, specificity together with the range of materials that may be identified.

A skilled person will appreciate that variations of the disclosed arrangements are possible without departing from the disclosure.

Accordingly, the above description of the specific embodiment is made by way of example only and not for the purposes of limitation. It will be clear to the skilled person that minor modifications may be made without significant changes to the operation described.

The invention claimed is:

1. An apparatus for use with a source of electromagnetic radiation, the apparatus comprising:
   a beam former adapted to receive electromagnetic radiation from the source to provide a polygonal shell beam formed of at least three walls of electromagnetic radiations, wherein the polygonal shell beam is a hollow beam without electromagnetic radiation between the at least three walls;
   at least one collimator comprising a plurality of channels, each channel being adapted to receive diffracted or scattered radiation at an angle; and
   an energy-resolving detector arranged to detect radiation diffracted or scattered by a sample upon an incidence of the polygonal shell beam onto the sample and transmitted by the at least one collimator.

2. The apparatus as claimed in claim 1, wherein the beam former comprises a slit having a shape, wherein the shape of the slit has an order of rotational symmetry that is finite and equal or greater than two.

3. The apparatus as claimed in claim 2, wherein the shape of the slit forms a frustum of a pyramid with a polygonal base.

4. The apparatus as claimed in claim 3, wherein the shape of the slit comprises an extended slit portion along one side of the frustum of the pyramid to generate a fan beam that shares a wall with the polygonal shell beam.

5. The apparatus as claimed in claim 1, wherein the beam former comprises a plurality of slits.

6. The apparatus as claimed in claim 1, wherein the at least one collimator extends along a longitudinal axis, and wherein the at least one collimator forms a hollow region along the longitudinal axis.

7. The apparatus as claimed in claim 1, wherein the polygonal shell beam has a characteristic propagation axis associated with it; and wherein the at least one collimator is provided along the characteristic propagation axis of the polygonal shell beam.

8. The apparatus as claimed in claim 1, wherein the at least one collimator comprises a plurality of collimators, each collimator being arranged to receive diffracted or scattered radiation arising from different regions of the polygonal shell beam.

9. The apparatus as claimed in claim 1, wherein the energy-resolved detector is spatially resolved.

10. The apparatus as claimed in claim 1, wherein the apparatus is a retrofit device adapted to be retrofitted with a sample inspection system.

11. A sample inspection system comprising:
    a source of electromagnetic radiation; and
    an apparatus, the apparatus comprising:
       a beam former adapted to receive electromagnetic radiation from the source to provide a polygonal shell beam formed of at least three walls of electromagnetic radiations,
       wherein the polygonal shell beam is a hollow beam without electromagnetic radiation between the at least three walls;
       at least one collimator comprising a plurality of channels, each channel being adapted to receive diffracted or scattered radiation at an angle; and
       an energy-resolving detector arranged to detect radiation diffracted or scattered by a sample upon an incidence of the polygonal shell beam onto the sample and transmitted by the at least one collimator.

12. The sample inspection system as claimed in claim 11, wherein the source of electromagnetic radiation comprises a source of ionizing radiation.

13. The sample inspection system as claimed in claim 11, further comprising: a platform adapted to receive the sample.

14. The sample inspection system as claimed in claim 11, further comprising: a fan-shaped beam former for generating a fan-shaped beam; and an absorption detector adapted to detect an X-ray absorption of the fan-shaped beam through the sample.

15. The sample inspection system as claimed in claim 14, wherein the absorption detector is a linear detector having a detection surface limited by a first longitudinal side and a second longitudinal side, wherein the at least one collimator comprises a first collimator and a second collimator, the first collimator being arranged on the first longitudinal side and the second collimator being arranged on the second longitudinal side of the absorption detector.

16. The sample inspection system as claimed in claim 11, further comprising: a calculator configured to calculate a parameter of the sample based on the detected diffracted or scattered radiation, wherein the parameter comprises a lattice spacing of the sample.

17. The sample inspection system as claimed in claim 16, wherein the source of electromagnetic radiation comprises a polychromatic source, and wherein the calculator is adapted to calculate a range of lattice spacings of the sample.

18. The sampled inspection system as claimed in claim 16, wherein the calculator is configured to perform an image reconstruction.

19. A method of identifying a sample, the method comprising:
    providing a polygonal shell beam formed of at least three walls of electromagnetic radiation, wherein the polygonal shell beam is a hollow beam without electromagnetic radiation between the at least three walls;
    collecting radiation diffracted or scattered by the sample using a plurality of channels, each channel being adapted to receive diffracted or scattered radiation at an angle; and
    detecting the radiation diffracted or scattered by the sample.

20. The method as claimed in claim 19, further comprising: calculating a parameter of the sample based on the detected diffracted or scattered radiation, wherein the parameter comprises a lattice spacing of the sample.

21. The method as claimed in claim 19, further comprising: collecting the diffracted or scattered radiation at a maximum angle, wherein the maximum angle arises from an incident ray propagating along an edge of the polygonal shell beam.

22. The method as claimed in claim 19, further comprising: collecting the diffracted or scattered radiation at a minimum angle, wherein the minimum angle arises from an incident ray propagating along a slant height of the polygonal shell beam.

23. The method as claimed in claim 19, further comprising:
    collecting at a first time diffracted or scattered radiation arising from a first interaction of the sample with a first wall of the polygonal shell beam;
    collecting at a second time diffracted or scattered radiation arising from a second interaction of the sample with a second wall of the polygonal shell beam; and
    integrating the diffracted or scattered radiation collected at the first time and the second time.

24. The method as claimed in claim 19, further comprising:
    translating the sample along a translation axis, the translation axis being coplanar with a wall among the at least three walls of electromagnetic radiation of the polygonal shell beam;
    collecting diffracted or scattered radiation arising from a plurality of interaction points of the sample with the wall upon a translation of the sample; and
    integrating the diffracted or scattered radiation collected at each interaction point.

* * * * *